BEST AVAILABLE COPY

T857,025

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

857 O.G. 695

571,996

PROCESS FOR THE PRODUCTION OF CATIONIC DYES

John G. Fisher, Box 511, Kingsport, Tenn. 37662

Filed Aug. 12, 1966. Published Dec. 17, 1968

Class 260—156

No Drawing. 15 Pages Specification

A process for the conversion of dyes to cationic dyes which comprises reacting a dye containing a hydroxyalkyl group with an alkyl- or aryl-sulfonyl-halide in the presence of a pyridine and at an elevated temperature. The products, containing a pyridinium group, are useful as dyes for acrylic and modacrylic textile materials.